W. G. WAGENHALS.
TRACTOR.
APPLICATION FILED JUNE 26, 1918.

1,298,127.

Patented Mar. 25, 1919.
3 SHEETS—SHEET 1.

W. G. WAGENHALS.
TRACTOR.
APPLICATION FILED JUNE 26, 1918.

1,298,127.

Patented Mar. 25, 1919.
3 SHEETS—SHEET 3.

WITNESS
C. E. Braman.

W. G. Wagenhals.
INVENTOR.
BY
Pagelsen and Spencer
ATTORNEYS.

UNITED STATES PATENT OFFICE.

WILLIAM G. WAGENHALS, OF DETROIT, MICHIGAN.

TRACTOR.

1,298,127.  Specification of Letters Patent.  Patented Mar. 25, 1919.

Application filed June 26, 1918. Serial No. 242,065.

*To all whom it may concern:*

Be it known that I, WILLIAM G. WAGENHALS, a citizen of the United States, and residing at Detroit, in the county of Wayne and State of Michigan, have invented a new and Improved Tractor, of which the following is a specification.

This invention relates to motor vehicles of the tractor type which are especially adapted to dragging heavy loads or agricultural implements or machines over soft ground and its object is to provide a tractor which shall have great pulling power for its weight and which will be very stable.

This invention consists of a motor vehicle provided with a frame, an engine on the frame to drive the vehicle, of a solid axle carried in proper bearings on the frame, tractor wheels secured on the ends of the axle, of an auxiliary frame for a tractor or caterpillar belt having one end mounted on the axle and having an idler wheel at its free end, a driving wheel for the tractor belt secured to the rear axle, and heavy springs to press the free end of the belt down onto the ground. It also consists in so proportioning the belt and its driving wheel and the traction wheels on the ends of the axle on which the belt is mounted that the wheels will usually be free from the ground. It further consists in the details of construction illustrated in the accompanying drawings and particularly pointed out in the claims.

Figure 1:
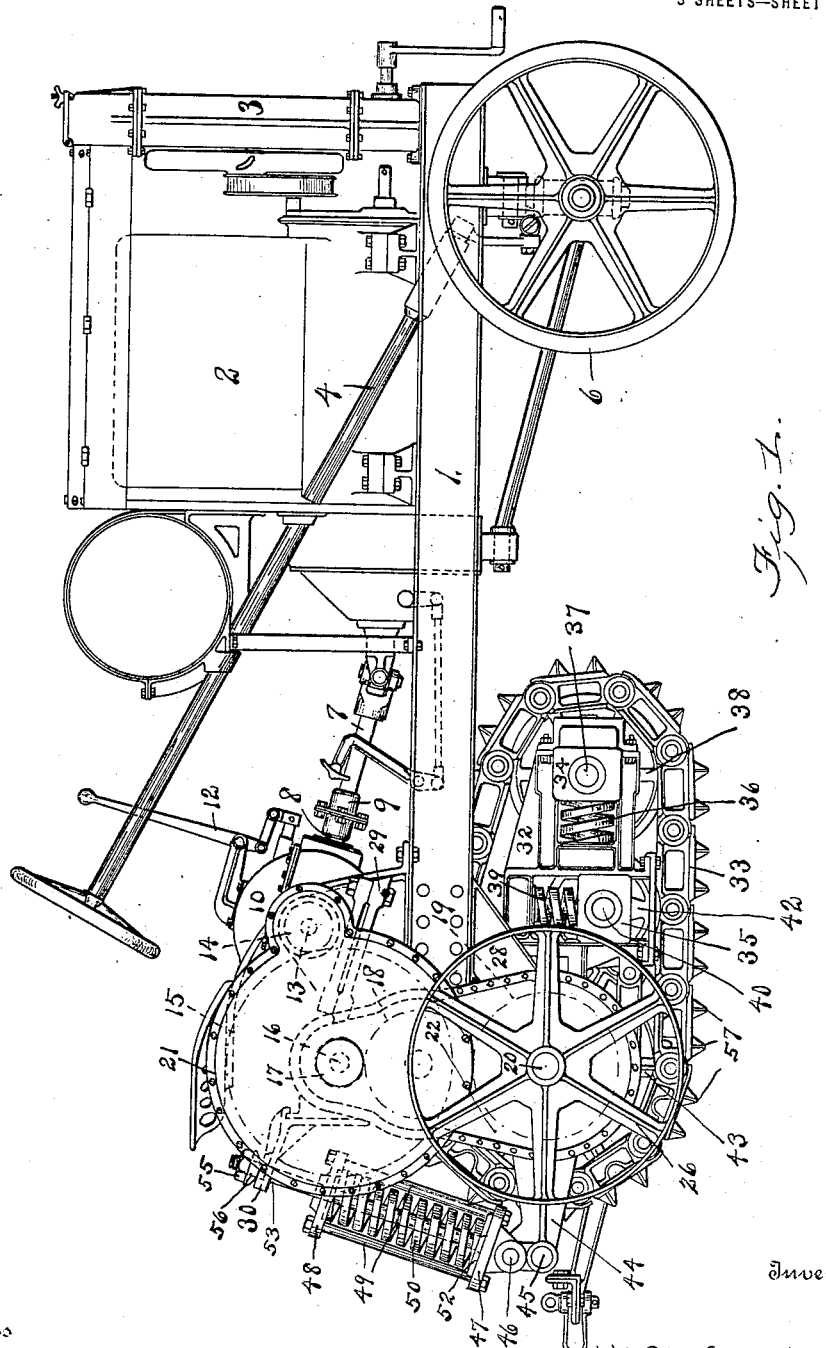
Figure 2:
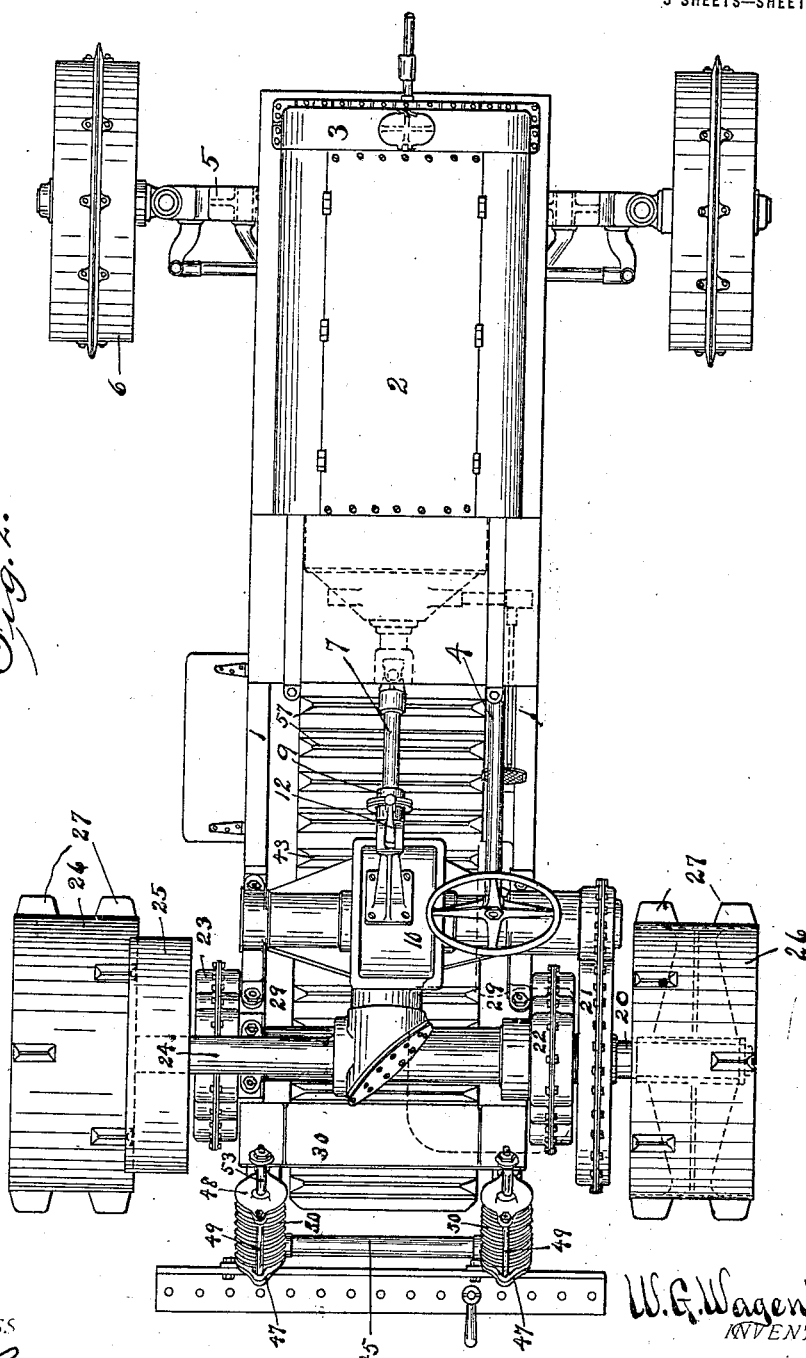
Figure 3:
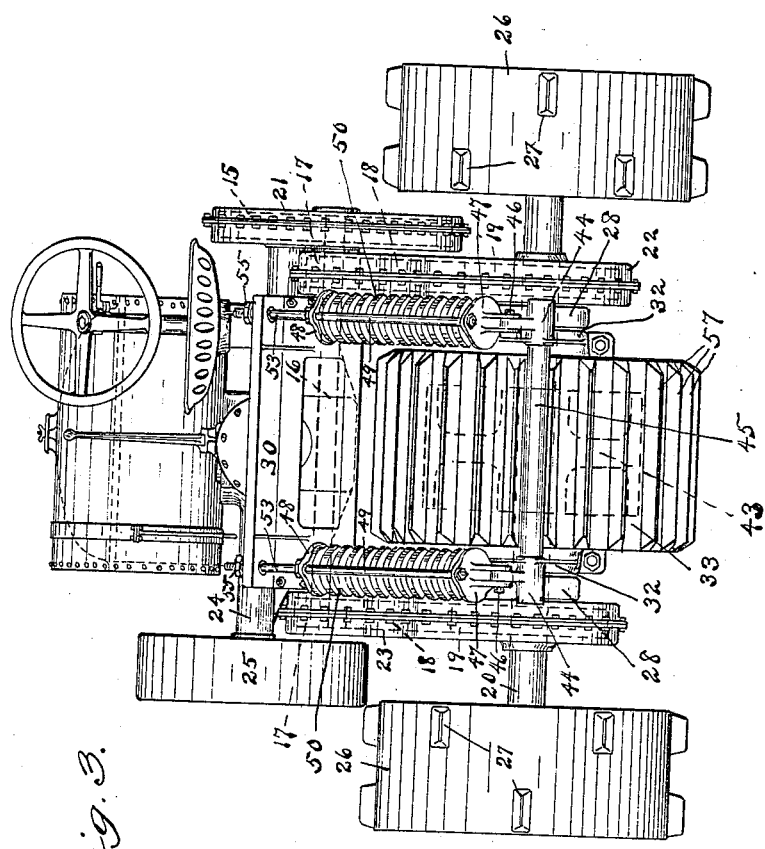

In the drawings, Figure 1 is a side elevation of this improved tractor. Fig. 2 is a plan thereof. Fig. 3 is a rear elevation thereof.

Similar reference characters refer to like parts throughout the several views.

The side bars 1 of the frame, the engine 2, the radiator 3, the steering mechanism 4, the front axle 5 and front wheels 6 may be of any desired construction. The rear end of the shaft 7 connects to the shaft 8 by means of a universal coupling 9.

Mounted on the side bars 1 is a casing 10 for the reversing mechanism of any desired construction, operated by the lever 12. The reversing mechanism drives a countershaft 13, which carries a pinion 14 that meshes with a gear 15 on a main shaft 16 that extends across the machine and has pinions 17 secured to it. These pinions mesh with idlers 18, which in turn, mesh with gears 19 secured to the rear axle 20. Casings 21, 22 and 23 may be used to inclose the various gears. The rear end of the shaft 8 connects to the transverse shaft 24 which carries a driving pulley 25. These details are all well known in the art and are therefore merely indicated by dotted lines. Any other mechanism may be employed to transmit power from the engine to the rear axle. It will be noticed that the rear axle is continuous and that no differential gearing is employed.

Secured to the ends of the rear axle are the tractor wheels 26, which may be provided with lugs 27. Frames 28 (Fig. 1) extend down from the side bars 1 of the chassis to support the bearing for the axle and other frames 29 are mounted on the side bars to support the bearings for the shafts 13 and 16. A cross frame 30 extends transversely between the frames 29.

Mounted on the rear axle 20 (Fig. 1) are two auxiliary frames 32 for the tractor belt 33, and in each of them the two bearings 34 and 35 are slidable. Springs 36 press forward the former and the shaft 37 and idler wheel 38 thereon, while the springs 39 resist the upward thrust of the shaft 40 and wheel 42. Between the frames 32 is the driving wheel 43 of the tractor belt, also shown in dotted lines in Fig. 3. It is to be understood that the details of construction of the belt and of the wheels around and under which it passes form no part of this invention and that any desired type of belt and wheels may be employed so long as adapted for the purpose.

The frames 32 are continued rearwardly from the axle 20 in the form of two arms 44, connected by a shaft 45. Pins 46 carried by these arms support the heads 47 connected to the heads 48 by means of bolts 49, which, together with the heads constitute cages for the compression springs 50 which are engaged at their lower ends by the disks 52 on the lower ends of the rods 53 which extend up centrally through the springs 50 and the heads 48 to the cross frame 30. The nuts 55 on these bolts determine the tension and the round bottomed washers 56 permit the rods 53 to swing freely.

The radius of the wheels 26 is slightly less than the distance from the center of the rear axle to the working face of the tractor belt and the lugs 27 are preferably shorter than the slats 57 on the belt so that ordinarily, the rear end of the tractor will be entirely supported by the belt 33. But if the tractor should lean toward either one side or the other, the tractor wheel 26 on that side will contact with the ground and not only prevent the machine from tipping over but assist in driving it. The proportion of the weight of the tractor carried by the front end of the belt, which means the pressure of the belt against the ground will be determined by the pull of the rods 53. If the ground is so soft that the belt sinks, the wheels 26 will assist in supporting the tractor.

The invention resides in the mounting of the belt supporting frame on the rear axle alone, forcing the front part of the belt against the ground by resilient devices, driving and supporting the belt by proper means mounted on the rear axle, and mounting stabilizing tractor wheels on the ends of this same axle. The details and proportions of the various parts last enumerated may all be changed by those skilled in the construction of tractors without departing from the spirit of my invention as set forth in the claims. Thus the lugs on the wheels 26 may be left off and these wheels employed only for the purpose of stabilizing the vehicle.

I claim:—

1. In a tractor, the combination of a frame and a rear axle, means to drive the rear axle, tractor wheels secured to the ends of the axle, an auxiliary frame mounted on the axle between the tractor wheels and extending forwardly therefrom, tractor belt wheels mounted centrally of the tractor on the auxiliary frame and on the rear axle, the latter being a driving wheel, a tractor belt extending around said wheels, and means to depress the front end of the auxiliary frame.

2. In a tractor, the combination of a frame, a rear axle, tractor wheels secured thereto, a driving wheel for a tractor-belt secured to the axle centrally of the tractor, an auxiliary frame pivoted on the rear axle and extending forwardly therefrom, a belt wheel at the front end of the frame, a tractor belt extending around the belt wheels, means to drive the rear axle, and springs to force down the front end of the tractor belt.

3. In a tractor, the combination of a frame and steering wheels at the front end thereof, a continuous rear axle carried by the frame and means to drive the axle, tractor wheels secured to the ends of the rear axle, a tractor-belt frame mounted on the rear axle between the tractor wheels and extending forward therefrom, a spring tensioned tightening wheel at the front end of this belt frame, a belt-driving wheel secured to the rear axle, a tractor belt mounted on said belt wheels, arms extending rearwardly from said belt-frame, and springs connecting to said arms to force down the front end of the belt-frame.

4. In a tractor the combination of the vehicle frame and a rear axle therefor, tractor wheels on the ends of the rear axle, a tractor belt and supporting mechanism therefor mounted on said rear axle centrally of the tractor and extending forward from the axle, means to drive said rear axle, and resilient means to press down the front end of the belt.

5. In a tractor the combination of the vehicle frame and a rear axle therefor, a tractor belt and supporting mechanism therefor mounted on said rear axle centrally of the tractor and extending forward from the axle, means to drive said rear axle, and resilient means to press down the front end of the belt, and stabilizing wheels secured to the ends of the rear axle.

6. A tractor having front steering wheels and a centrally disposed tractor frame and belt at its rear end, a driven rear axle on which the tractor frame and belt are mounted, tractor wheels on the ends of the axle and means to drive the rear axle.

7. A tractor having front steering wheels and a centrally disposed tractor belt and frame therefor, a driven rear axle on which the rear ends of the belt and frame are entirely supported, the driving mechanism of the belt being secured to the rear axle, tractor wheels secured to the ends of the rear axle, and means to drive the axle.

8. In a tractor, a rear axle, tractor wheels on the ends thereof, a tractor frame and belt mounted thereon at their rear ends centrally of the tractor and extending freely forward therefrom, means to drive the axle.

WILLIAM G. WAGENHALS.